US009268519B2

(12) United States Patent
Tai et al.

(10) Patent No.: US 9,268,519 B2
(45) Date of Patent: Feb. 23, 2016

(54) SYSTEM AND METHOD FOR UPDATING ELECTRONIC SHELF LABELS AND UPDATING APPARATUS AND METHOD OF AN ELECTRONIC SHELF LABEL

(71) Applicant: Industrial Technology Research Institute, Hsinchu (TW)

(72) Inventors: Yuan-Chu Tai, Hsinchu (TW);
Chun-Hsien Wu, Taichung (TW);
Yueh-Feng Lee, Taipei (TW);
Yang-Jung Lee, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 312 days.

(21) Appl. No.: 13/908,070

(22) Filed: Jun. 3, 2013

(65) Prior Publication Data
US 2014/0313012 A1    Oct. 23, 2014

(30) Foreign Application Priority Data

Apr. 18, 2013  (TW) .............................. 102113792 A

(51) Int. Cl.
*G06F 7/00*     (2006.01)
*G06F 3/147*    (2006.01)

(52) U.S. Cl.
CPC .......... *G06F 3/147* (2013.01); *G09G 2330/021* (2013.01); *G09G 2370/16* (2013.01); *G09G 2380/04* (2013.01)

(58) Field of Classification Search
CPC ......... G06F 3/147; G06Q 10/00; G06Q 30/00
USPC ...................................... 340/5.91, 5.92, 10.6
See application file for complete search history.

(56) References Cited

U.S. PATENT DOCUMENTS

| 5,797,132 A | 8/1998 | Altwasser |
| 6,026,373 A | 2/2000 | Goodwin, III |

(Continued)

FOREIGN PATENT DOCUMENTS

| TW | I250457 B | 3/2006 |
| TW | 200702697 | 1/2007 |
| TW | M418349 | 12/2011 |

OTHER PUBLICATIONS

Taiwan Patent Office, Notice of Allowance, Patent Application Serial No. TW102113792, Jan. 14, 2015, Taiwan.

(Continued)

*Primary Examiner* — Vernal Brown
(74) *Attorney, Agent, or Firm* — Lin & Associates Intellectual Property, Inc.

(57) ABSTRACT

An exemplary embodiment of a system for updating electronic shelf labels (ESLs) comprises multiple ESLs, and a gateway connected to the multiple ESLs to update data of the multiple ESLs. Each ESL comprises a transceiver having a media condition detector to detect whether other ESL(s) perform an update at the time slot, a controller, a memory, and a random number generator randomly selecting one of multiple time slots of a frame when an ESL update procedure begins, wherein the time slot corresponds to an index stored in the memory by the controller. The ESL performs the update at this time slot when none of said other ESL(s) performs the update at the time slot. When said other ESL(s) performs the update at the time slot, the controller enables the random number generator to randomly select another time slot from a next time frame.

29 Claims, 16 Drawing Sheets

(56) References Cited

U.S. PATENT DOCUMENTS

| | | | |
|---|---|---|---|
| 6,130,603 | A | 10/2000 | Briechle |
| 6,411,196 | B1 | 6/2002 | Bhyravabhotla |
| 7,073,081 | B2 | 7/2006 | Haulk et al. |
| 7,213,751 | B2 | 5/2007 | Backlund et al. |
| 7,551,149 | B2 | 6/2009 | Rosander et al. |
| 7,676,251 | B2 | 3/2010 | Sugie et al. |
| 8,061,601 | B1 | 11/2011 | Harkins et al. |
| 2001/0028300 | A1 | 10/2001 | Matsushita |
| 2007/0085689 | A1* | 4/2007 | Brommer et al. .......... 340/572.8 |
| 2007/0181678 | A1 | 8/2007 | Nilsson et al. |
| 2007/0188339 | A1* | 8/2007 | Sukegawa et al. ......... 340/691.6 |
| 2008/0088453 | A1* | 4/2008 | Kiji et al. .................... 340/572.1 |
| 2009/0243873 | A1 | 10/2009 | Mizukawa et al. |
| 2010/0109847 | A1 | 5/2010 | Noel et al. |
| 2011/0186633 | A1 | 8/2011 | Okabe et al. |
| 2011/0240731 | A1 | 10/2011 | Lee et al. |
| 2012/0326846 | A1 | 12/2012 | Tseng et al. |

OTHER PUBLICATIONS

A Lightweight & Effective Jamming Detection in Electronic Shelf Label Systems, Ponomarchuk Y., 2009, Proceedings of the 4th International Conference on Ubiquitous Information Technologies & Applications, p. 1-p. 6.

Electronic Shelf Label System Based on Public Illuminating Network, Hong Hong, 2008, IEEE Asia Pacific Conference on Circuits & Systems, p. 1103-p. 1106.

Flexible Power Scheduling for Sensor Networks, Barbara Hohlt et al, 2004, Proceedings of the 3rd International Symposium on Information Processing in Sensor Networks, p. 205-p. 214.

Scheduling Transmission of Bulk Data in Sensor Networks Using Dynamic TDMA Protocol, Volker, 2007, Proceedings of the 2007 International Conference on Mobile Data Management, p. 321-p. 325.

Network Scheduling for Data Archiving applications in Sensor Networks, Yong Yao et al, 2006, Proceedings of the 3rd workshop on Data Management for Sensor Networks, p. 19-p. 25.

Scheduled Rendezvous and RFID Wakeup in Embedded Wireless Networks, Mulan Nosovic, 2002, IEEE International Conference on Commnunications, p. 3325-p. 3329.

* cited by examiner

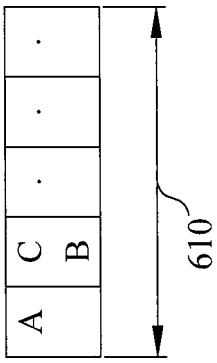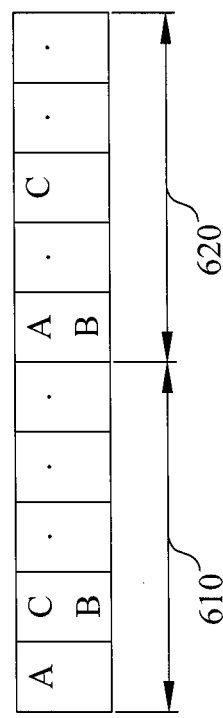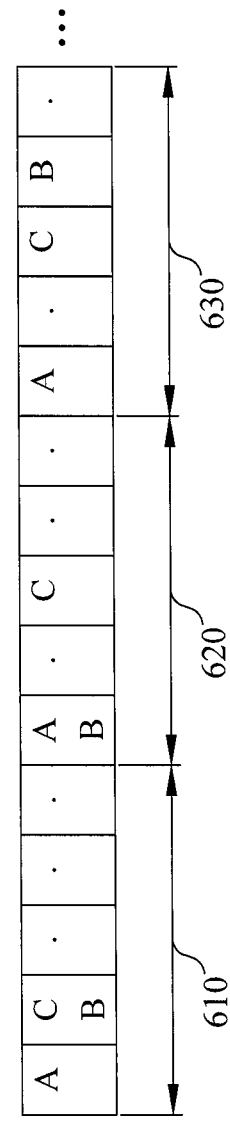
FIG. 6A  FIG. 6B  FIG. 6C

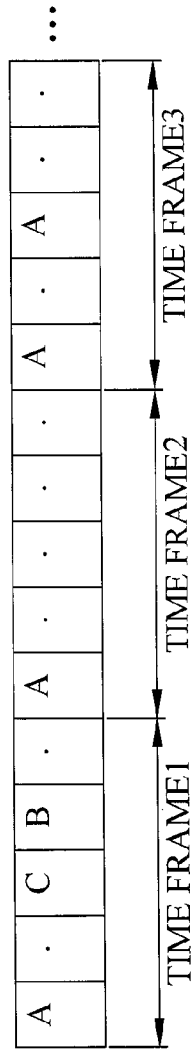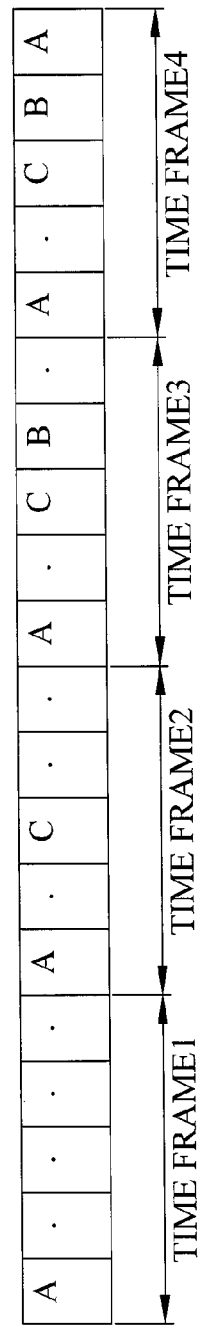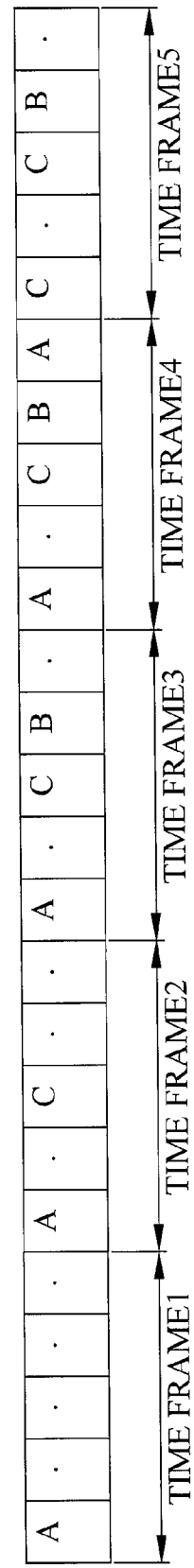
FIG. 10A
FIG. 10B

SYSTEM AND METHOD FOR UPDATING ELECTRONIC SHELF LABELS AND UPDATING APPARATUS AND METHOD OF AN ELECTRONIC SHELF LABEL

CROSS-REFERENCE TO RELATED APPLICATION

The present application is based on, and claims priority from, Taiwan Application No. 102113792 filed Apr. 18, 2013, the disclosure of which is hereby incorporated by reference herein in its entirety.

TECHNICAL FIELD

The present disclosure relates generally to a system and method for updating electronic shelf labels (ESLs) and an updating apparatus and method of an ESL.

BACKGROUND

ESL is a small display device, which may replace paper labels and provide information of product names and prices. An ESL system typically includes more than thousands to tens of thousands of ESLs and a gateway. This gateway may be connected to a back-end point of sale (POS) system, update the contents of the ESLs via infrared or low-power wireless RF, to synchronize with product information of a POS system database. The store usually updates an ESL system at several fixed times, such as begins to update all ESLs' contents before the business hour 8:00 in the morning. The used wireless transmission medium bandwidth of ESL is limited, may not allow multiple ESLs to be updated simultaneously. In order to reduce power consumption, the ESL system may not always turn on the wireless module. There are two types of methods for updating ESL(s) to solve these problems. One type is the central assigned schedule, and the other type is the on-demand wakeup.

The central assigned schedule is directly assigned by the gateway, and then notifies each ESL the update time point. The ESL only turns on the wireless transceiver module at the time point assigned by the gateway and communicates with this gateway to update. When the ESL system begins the update, the gateway broadcasts each ESL the time of update. As shown in the example of FIG. 1, it is assumed that an ESL system includes three ESLs A, B, C. When the update begins, such as indicated by an arrow 110, all ESLs (i.e., ESL A, ESL B, and ESL C) together turn on their respective wireless transceiver module to receive the update schedule message broadcasted by the gateway, and ESL A, ESL B, and ESL C update in accordance with the time point specified in this message. Usually, the gateway issues a preamble signal before a predetermined update time, all ESLs at a same time wake up together triggered by an internal clock, after listening to the preamble signal, wake up again at a predetermined time to receive addresses and information according to the time point specified in the afore mentioned message, and return confirmation signals.

The ESL updating method of the central assigned schedule has a variety of variations. As shown in the example of FIG. 2, a power saving method in the ESL system includes a host computer to determine when messages will not be transmitted to any ESL within a time period p beginning from a time point t (step 202). The host computer transmits a power saving message to the ESL (step 204), and the contents in the message contain the time point t and the time period p. After the ESL receives the message, it enters the power saving mode beginning from the time point t, until passing the time period p (step 206). In other words, in this method updating the time point is not decided by the ESL itself, while the host computer directly determines the time point of the communication between the ESL and a gateway.

The on-demand wakeup method requires a wireless transceiver module configured on each ESL to receive update information, and also requires a receiver module configured to delicately receive specific wireless trigger signal(s). This trigger signal receiving module usually is a low power or passive radio frequency (RF) receive element, and the gateway or the host computer does not directly inform each ESL of the update time point. As shown in the example of FIG. 3, when a host computer wants to update an ESL 300, it first issues a trigger signal 322. The trigger receiving unit 342 in the ESL 300 receives this trigger signal, decodes and determines the recipient is itself, then wakes up a radio data communication unit 344 of the ESL 300 and begins to communicate with the base station to receive update information. Another technique discloses that a server host computer transmits a time-sharing control signal. After the ESL receives the control signal, it decodes the control signal to set next wakeup time point.

Many ESL update techniques have been proposed. In general, in the aforementioned two types of ESL update technology, the update procedure or period of the central assigned schedule relies on the gateway or the host computer arranges and notifies each ESL for each ESL update. When the schedule message that the gateway transmits to the ESL is interfered by interferences to lead to a communication failure, some or all ESLs may not receive the schedule, and the gateway needs to perform re-schedule and re-notification. In the actual application environment such as the environment of the store, due to the store environment being complex and full of changes, such as interference by consumers carrying all kinds of electronic appliances or crowded environment may completely obscure the line of sight of the ESLs and the gateway, the ESL is unable to receive the update schedule message, or unable to complete the update at the specified update time, and both may cause update failure for the affected ESL. Although there are corresponding solutions for this problem, for example, the staff completes the update manually with a hand-held device, but this method may increase the burden of labor cost. While the on-demand wakeup method requires additionally the receiver module configured and dedicated to receive the specific wireless trigger signal for each ESL, it increases the hardware cost of each ESL.

SUMMARY

The exemplary embodiments of the present disclosure may provide a system and method for updating ESLs and an updating apparatus and method of an ESL.

One exemplary embodiment relates to a system for updating ESLs, comprising multiple ESLs and a gateway. The gateway is connected to the multiple ESLs to update at least one data of at least one of the multiple ESLs, and each ESL further includes a transceiver, a controller, a memory, and a random number generator. The random number generator randomly selects a time slot from multiple time slots of a time frame when an ESL update procedure begins, wherein the time slot corresponds to an index value. The transceiver includes a media condition detector to detect whether other ESL(s) of the multiple ESLs performs an update at the time slot. The controller stores the index value in the memory, and the ESL performs an update at the time slot when none of said other ESL(s) performs the update at the time slot; and the controller enables the random number generator to randomly select another time slot from a next time frame when said other ESL(s) performs the update at the time slot.

Another exemplary embodiment relates to a method for updating ESLs, adapted to an ESL system having multiple ESLs. The method may comprise: in deploying the multiple ESLs, setting an update parameter and taking a time slot being a predetermined length of a time segment, as a basic unit of an ESL update schedule; randomly selecting a time slot in the multiple time slots of a time frame when an ESL update procedure begins for each ESL of the multiple ESLs, where the time slot corresponds to an index value; storing the index value in a memory, and when none of other ESL(s) of the multiple ESLs performs an update at the time slot, performing the update by the ESL, at the time slot of the time frame according to the update parameter; and when said other ESL(s) performs the update at the time slot of the time frame, randomly selecting another time slot in a next time frame, performing the update by the ESL, at the another time slot according to the update parameter.

Yet another exemplary embodiment relates to an updating method adapted to an ESL having at least one storage device to store at least one readable program code, and at least one processor reads the at least one readable program code to perform the updating method. The method may comprise: taking a time slot being a time segment of a predetermined length, as a basic unit of an ESL update schedule; when an ESL update procedure begins, randomly selecting, by the ESL, a time slot in multiple time slots of a time frame, wherein the time slot corresponds to an index value, and storing the index in a memory; when other ESL(s) performs an update at the time slot of the time frame, randomly selecting, by the ESL, another time slot in a next time frame, and performing the update, by the ESL, at the another time slot according to an update parameter; and when none of the other ESL(s) performs the update at the time slot, performing the update, by the ESL, at the time slot of the time frame according to the update parameter.

Yet another exemplary embodiment relates to an updating apparatus of an ESL. The updating apparatus may connect to a gateway, and may comprise a transceiver, a controller, a memory and a random number generator. When an ESL update procedure begins, the random number generator randomly selects a time slot from multiple time slots of a time frame, wherein the time slot corresponds to an index value. The transceiver has a media condition detector to detect whether other ESL(s) perform an update at the time slot. The controller stores the index value in the memory, and when none of said other ESL(s) perform the update at the time slot, the controller performs the update at the time slot. When said other ESL(s) perform the update at the time slot, the controller enables the random number generator to randomly select another time slot in a next time frame.

The foregoing and other features of the exemplary embodiments will become better understood from a careful reading of detailed description provided herein below with appropriate reference to the accompanying drawings.

BRIEF DESCRIPTION OF THE DRAWINGS

FIG. 6A-FIG. 6C shows an exemplar illustrating an update procedure of ESLs, according to an exemplary embodiment.

FIG. 10A shows an exemplar illustrating deciding an ESL update schedule, according to an exemplary embodiment FIG. 10B shows another exemplar illustrating deciding an ESL update schedule, according to an exemplary embodiment.

DETAILED DESCRIPTION OF THE EXEMPLARY EMBODIMENTS

Figure 1:
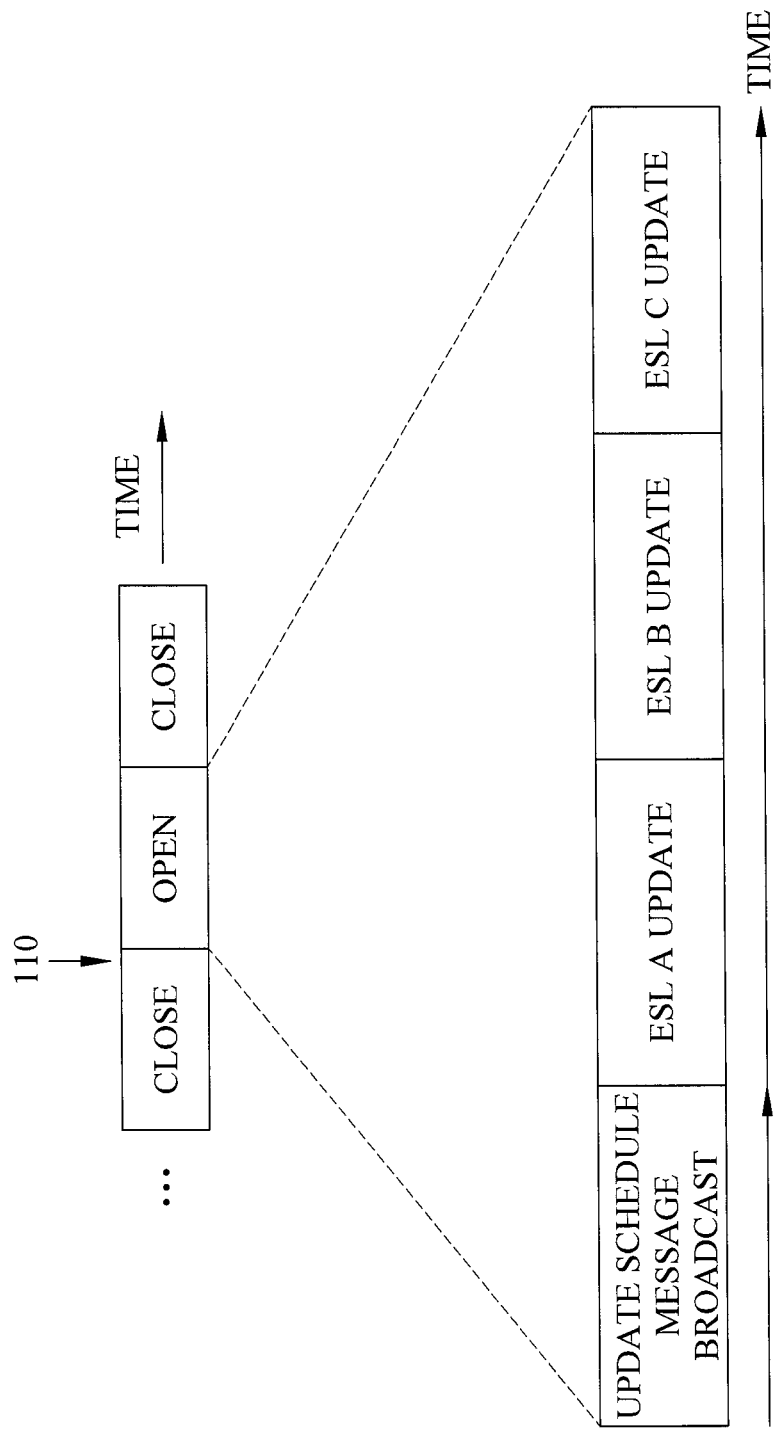
FIG. 1 shows an exemplary schematic view illustrating a method of central assigned schedule.
Figure 2:
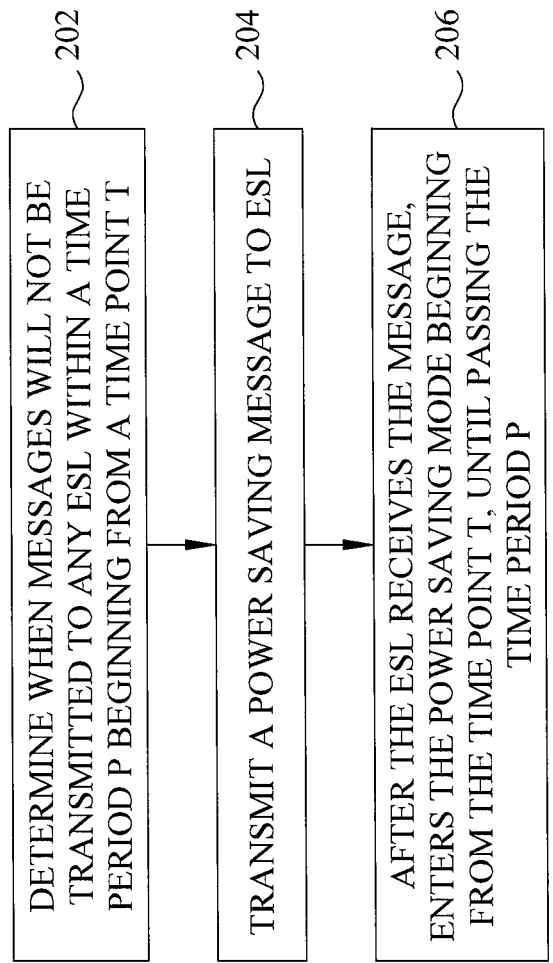
FIG. 2 shows a step flow of a central assigned schedule technology for updating ESLs.
Figure 3:
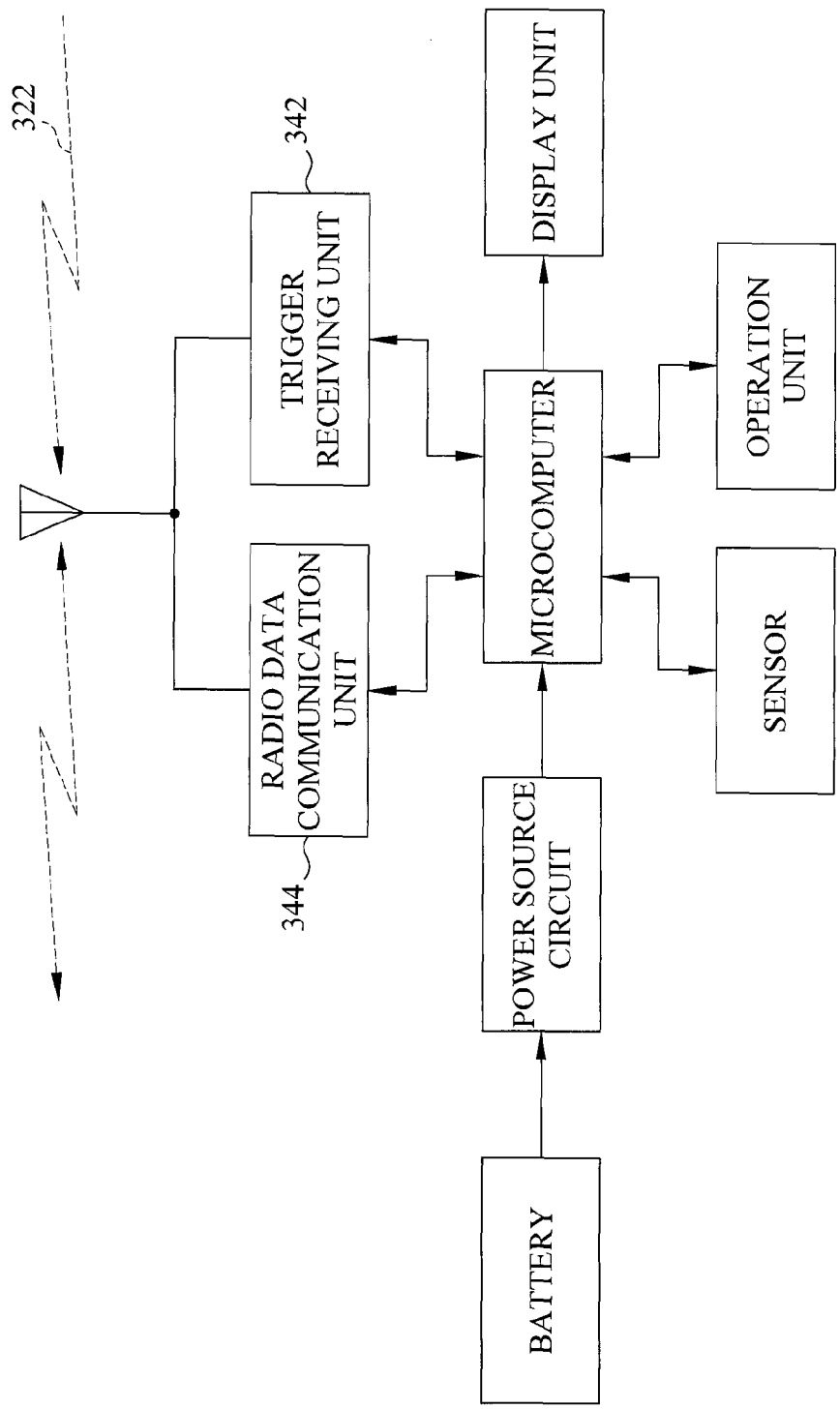
FIG. 3 shows an exemplary schematic view illustrating an on-demand wakeup technology for updating ESLs.

Below, exemplary embodiments will be described in detail with reference to accompanied drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments provide a technology for updating ESL(s). This technology may address the needs and characteristics of each ESL to propose an ESL update process with a distributed manner, co-ordination by these ESLs themselves, and self decision, rather than follow an update schedule assigned by a gateway. Each ESL may randomly select an update period according to the entire system capacity, and observes behaviors of other ESLs to coordinate each update process.

Figure 4A:
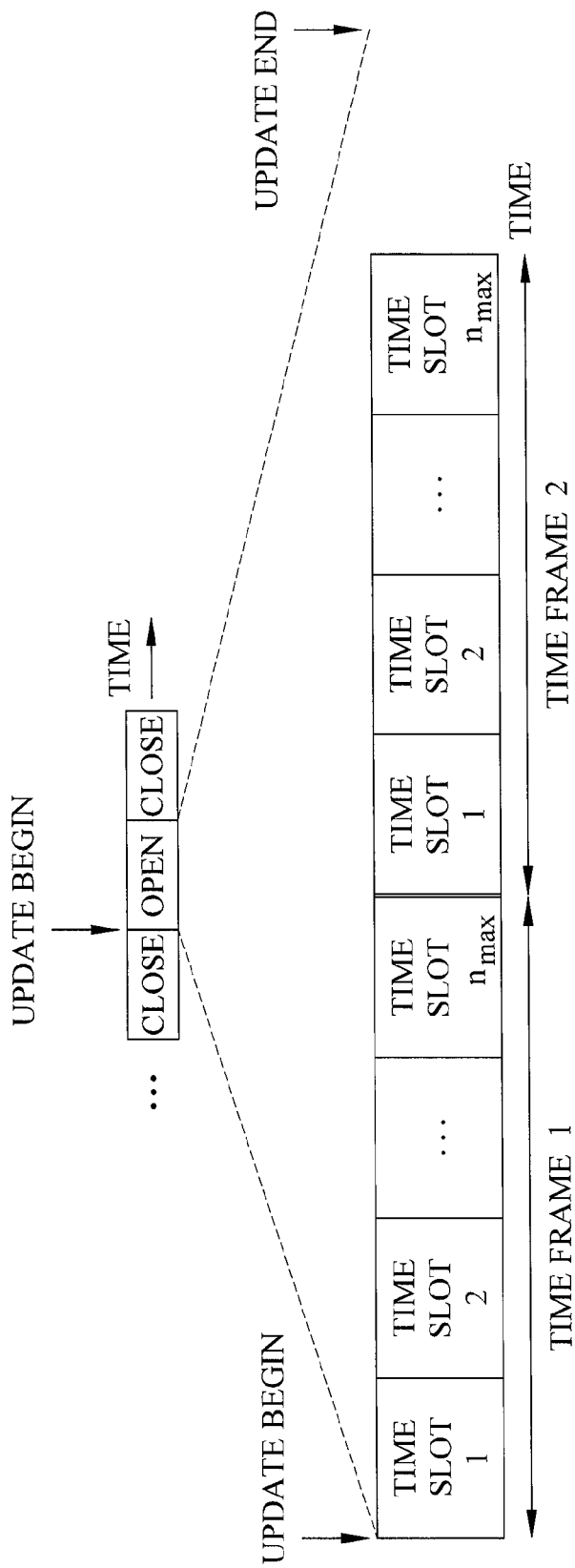
FIG. 4A shows basic units for an ESL scheduling, according to an exemplary embodiment.

In the disclosure, the basic unit for constructing the ESL update schedule is a time slot. The time slot is a time segment of a fixed and pre-determined length, e.g., 1 sec, and the length of each time slot is the same. A time frame is formed by $n_{max}$ time slots, where the $n_{max}$ represents the capacity of this ESL system, an upper limit of a total number of ESLs that this ESL system can handle is the value known by each ESL of all ESLs, and may be stored in a memory. Multiple time slots in a time frame are represented by the index values of 1 to $n_{max}$ according to a time order. As shown in FIG. 4A, an ESL system update usually requires multiple time frames to complete, and the index values of slot times of each time frame are from 1 to $n_{max}$. That is, the index value of the first time slot of each time frame is 1, the index value of the second time slot is 2, and so on.

Figure 4B:
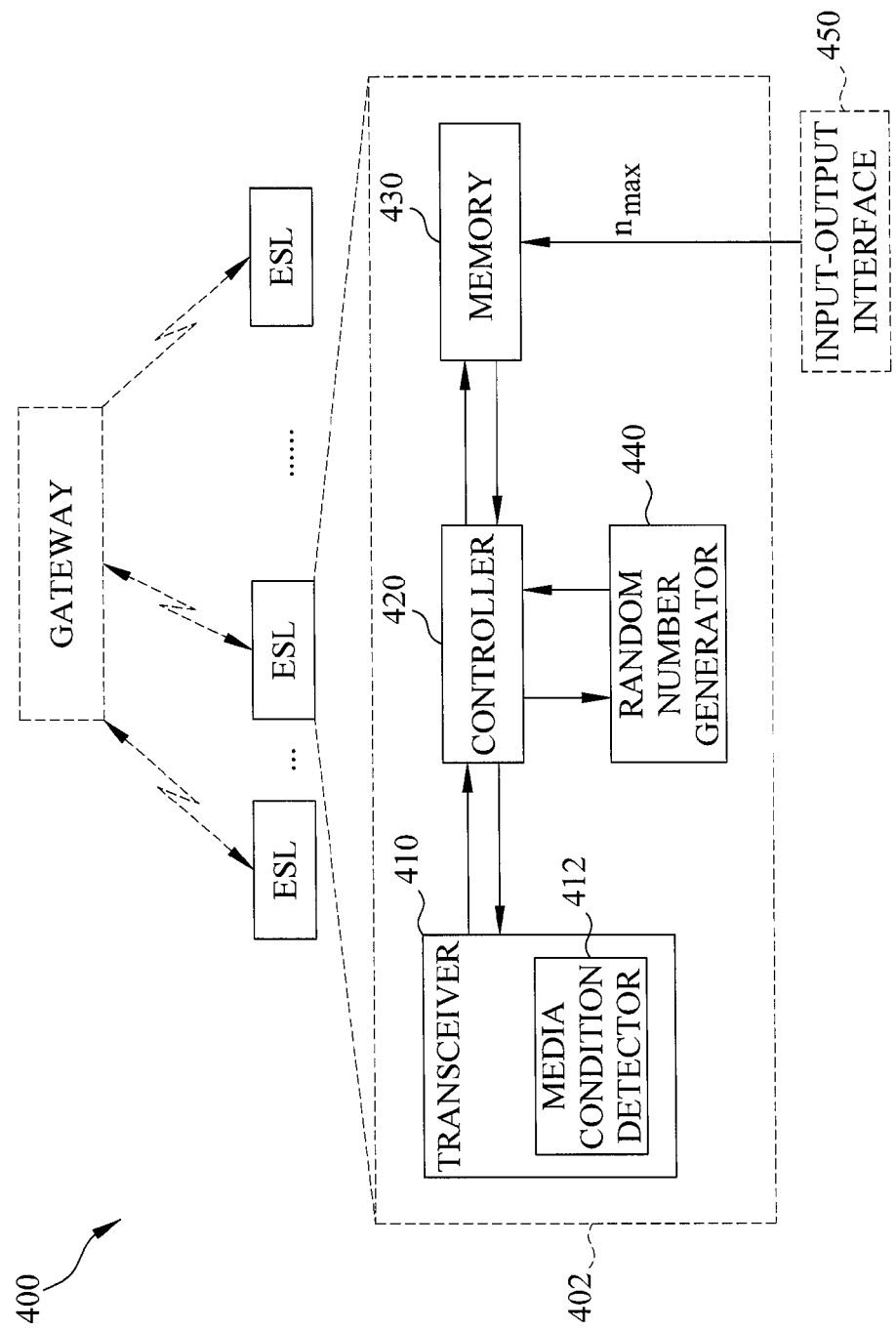
FIG. 4B shows a system for updating ESLs and the construction structure of an ESL thereof, according to an exemplary embodiment.

When deploying or initializing an ESL system, the aforementioned $n_{max}$ may be written in a memory by an input-output interface through a setting tool of corresponding ESLs. The input-output interface may be a serial port (RS-232), a universal serial bus (USB), infrared rays, or other interface specifications. FIG. 4B shows a system for updating ESLs and the construction structure of an ESL thereof, according to an exemplary embodiment. As shown in FIG. 4B, a system for updating ESLs 400 may comprise a gateway 405 and multiple ESLs. The gateway 405 connects to the multiple ESLs to update data of at least one of the ESLs. Each ESL 402 may further include a transceiver 410, a controller 420, a memory 430, and a random number generator 440. The transceiver 410 communicates with the gateway 405 in a wireless manner. Wherein when an ESL update procedure begins, the random number generator 440 randomly selects a time slot from multiple time slots of a time frame, and the time slot corresponds to an index value. A media condition detector 412 in the transceiver 410 detects whether other ESL(s) performs an update at the time slot. The controller 420 stores the index value corresponding to the time slot in the memory 430. When none of said other ESL(s) performs the update at this time slot, the ESL perform the update at the time slot; when said other ESL(s) performs the update, the random number generator 440 is enabled to randomly select another time slot in a next time frame.

The transceiver 410 communicates with the gateway in a wireless manner. The gateway updates the data of the ESLs in a wireless manner, and may connect to a commodity database to synchronize with multiple corresponding commodities in the commodity database. When each ESL joins the ESL system 400, the $n_{max}$ may be written in a respective memory through an input-output interface 450. The random number generator 440 generates a random value according to a specified range provided by the controller 420. After the ESL system completes the deployment, when the total number of ESLs of the ESL system has a considerable change under a normal operation, the ESL may also, through the transceiver 410, simultaneously receive a new $n_{max}$ from the gateway during the update. Alternatively, when a new ESL joins the ESL system in operation, the new ESL may receive a current $n_{max}$ from other ESL(s) through the transceiver 410 and calculate a new $n_{max}'$, i.e. $n_{max}'=n_{max}+1$, then transmits the new $n_{max}'$ to other ESL(s) through the transceiver 410. The ESL(s) received the new nmax' further transmits it to other ESL(s) until all ESLs of the entire ESL system have received the new nmax'. When the change of the total number of ESLs in the ESL system 400 exceeds a pre-determined number, each ESL in the system 400 receives a new upper limit of the total number of ESLs in ESL system through the transceiver 410.

Figure 5:
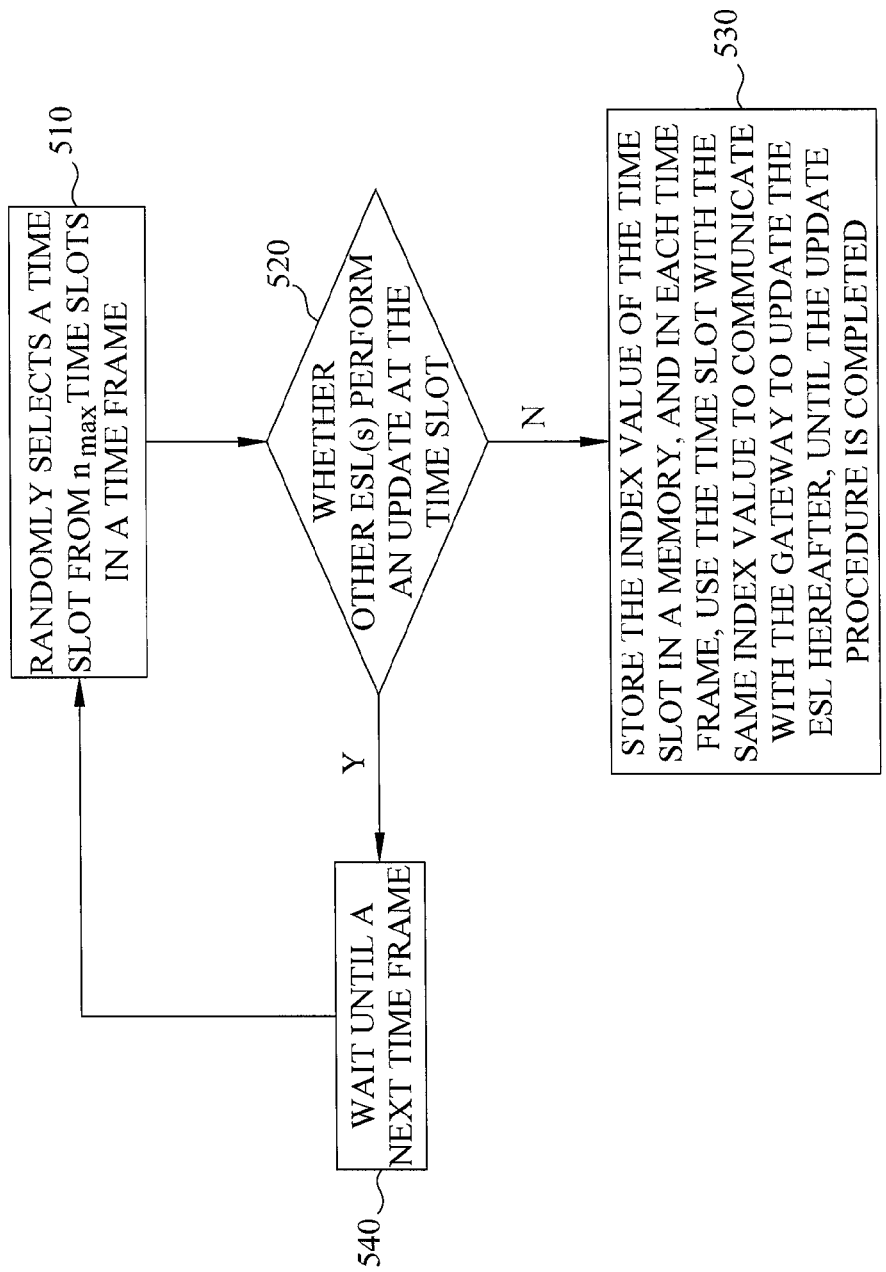
FIG. 5 shows the operation for performing an update of an ESL, according to an exemplary embodiment.

FIG. 5 shows the operation for performing an update of an ESL, according to an exemplary embodiment. As shown in FIG. 5, when an ESL starts an update procedure, the random number generator 440 generates a random number within the range of 1 to $n_{max}$, which means that it randomly selects a time slot from $n_{max}$ time slots in a time frame (step 510), and thus the probability of selecting any time slot is $1/n_{max}$. According to the reply of the media condition detector 412 on whether the wireless media or the channel has been used by other ESL(s) to update at the time slot (step 520), such as based on IEEE 802.15.4, MAC may use Clear Channel Assessment (CCA) to observe whether the channel has been used by other device(s), or issue a brief message for asking a response from the gateway. When other ESL(s) also performs the process at the same time, then the response would have a collision and may not be received correctly. Thus, when none of other ESL(s) uses the time slot, the index value of the time slot is stored in a memory, and in each time frame, the time slot with the same index value is used to communicate with the gateway to update the ESL hereafter, until the update procedure is completed (step 530). When the time slot is used by other ESL(s), then the ESL waits until a next time frame (step 540), and returns to step 510. The ESL may check, such as the ACK or the checksum of received update data to make sure that none of the other ESL(s) also selects the same time slot to perform update at the time slot.

FIG. 6A-FIG. 6C shows an exemplar illustrating an update procedure of ESLs, according to an exemplary embodiment. Assuming there are three ESLs A, B, and C in a system, and each time frame has five time slots ($n_{max}=5$). In the first time frame 610, as shown in FIG. 6A, ESL A randomly selects a time slot 1 and constantly uses the time slot 1 of the index value, ESL B and ESL C randomly select a time slot 2, both detect the time slot 2 as being used by other ESL so they give up the time slot 2. In the second time frame 620, as shown in FIG. 6B, ESL A constantly uses the time slot 1; ESL C randomly selects a time slot 3 and constantly uses the time slot 3 of the index value; ESL B randomly selects the time slot 1, ESL B detects the time slot 1 is used by other ESL so it gives up the time slot 1. In the third time frame 630, as shown in FIG. 6C, ESL B re-randomly selects the time slot 4 and constantly uses the time slot 4 until the update is completed.

Figure 7:
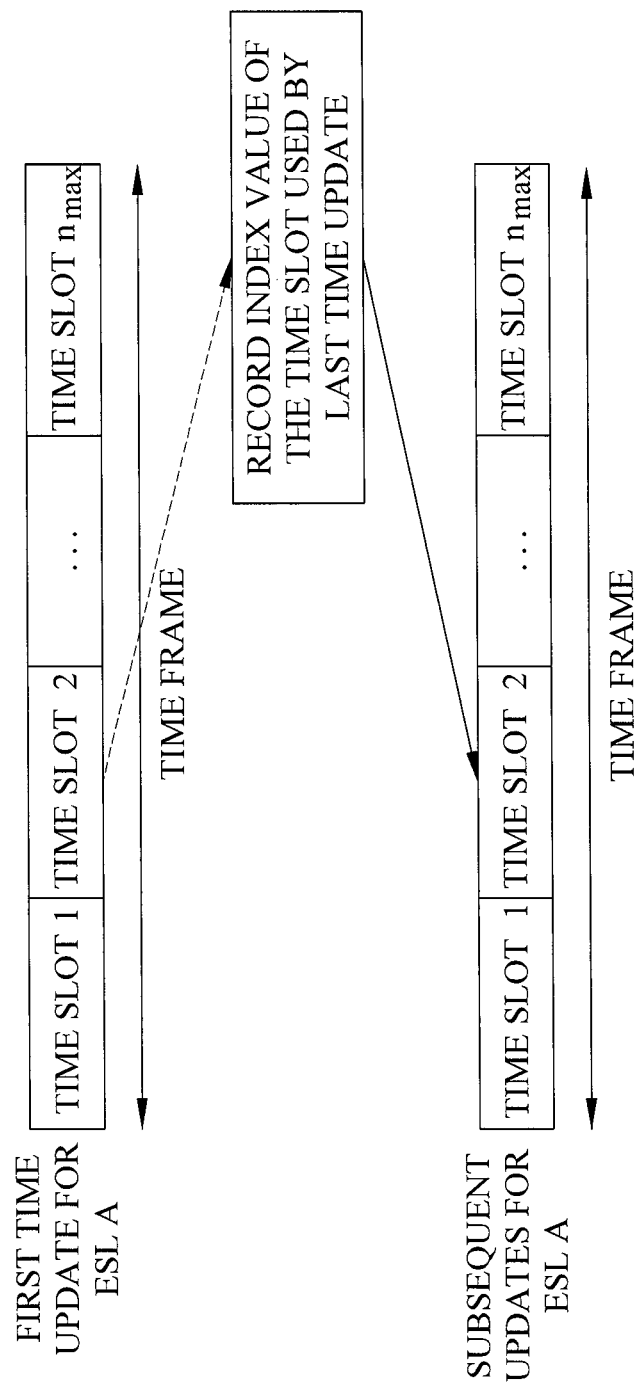
FIG. 7 shows an exemplar illustrating an ESL records the index value of time slot used for last update, according to an exemplary embodiment.

In exemplary embodiments of the disclosure, the memory of each ESL may record the update parameter, the index value of the current occupied time slot, and an index value queue of known time slots occupied by other ESL(s). In other words, each ESL may record the time slot occupied, thus the ESL does not need to select randomly at the first time frame of the next update, but directly uses the memorized time slot, and thus the time of the update schedule coordination between ESLs may be shortened. As shown in the exemplar of FIG. 7, the ESL A occupies the time slot 2 for the first time update, and its memory records the time slot 2 occupied by itself and the time slot 1 occupied by other ESL(s). ESL A does not need to randomly select at first time frame in subsequent updates, but directly use the time slot 2 occupied by itself.

Figure 8:
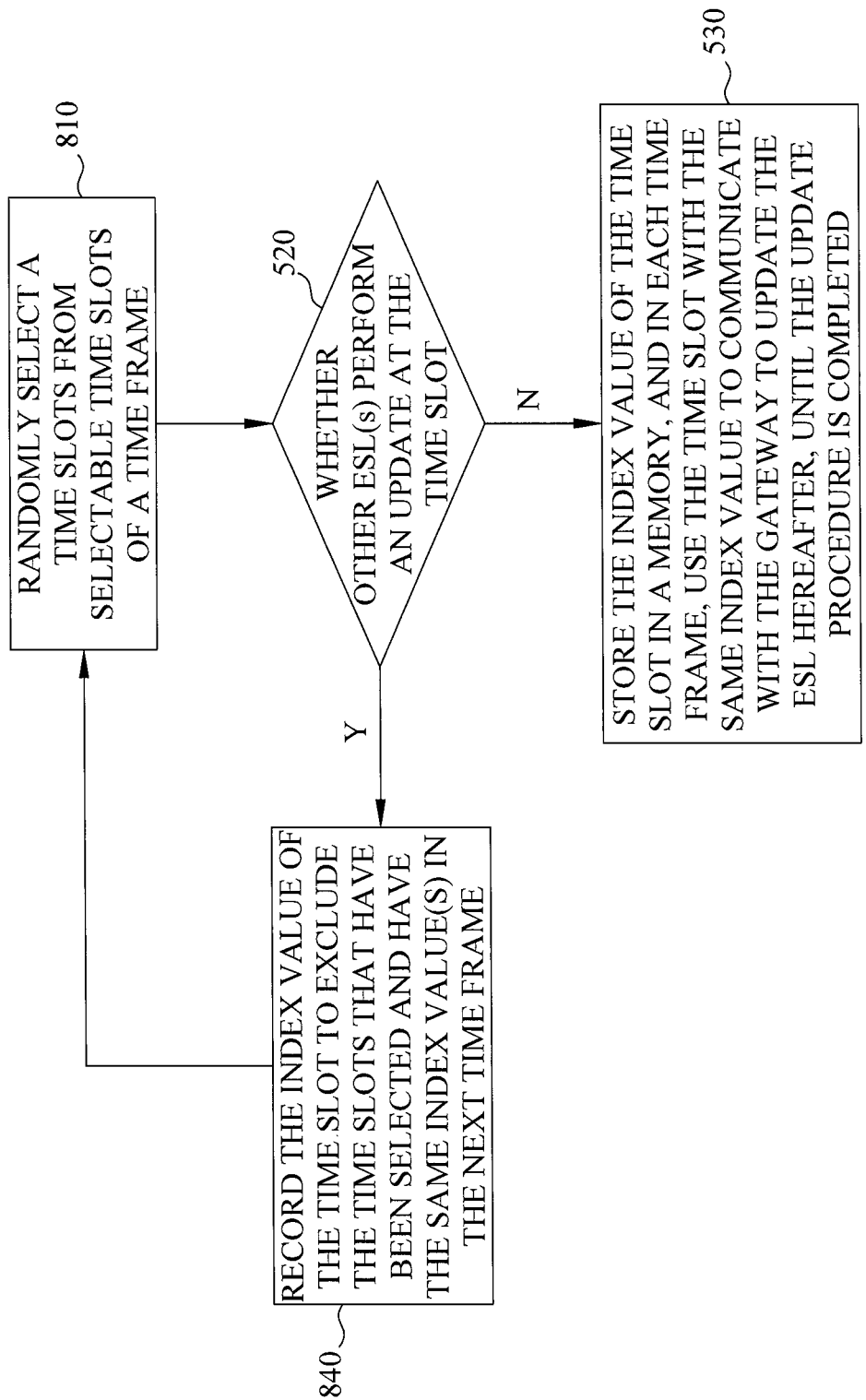
FIG. 8 shows the operation for performing an update of an ESL, according to another exemplary embodiment.

FIG. 8 shows the operation for performing an update of an ESL, according to another exemplary embodiment. Different from FIG. 5, this embodiment may add the index values(s) of time slot(s) used by all other ESL(s) to an index queue of known time slots occupied by other ESL(s) in each ESL's memory, so that when the next time frame is re-elected, the ESL may randomly select a time slot from selectable time slots (i.e., the time slots that are not in this index queue) of a time frame (step 810). At the moment, the probability of selecting a time slot is $1/(n_{max}-n_{opy})$, wherein $n_{opy}$ is the number of entries in the known index queue of known time slots occupied by other ESL(s), mentioned here is an index queue of known time slots occupied by other ESLs. In other words, the length of this queue only needs to store the index values of the number of time slots, because this index queue records the index values of several time slots recently used by other ESL(s), to avoid selecting time slots known occupied by other ESL(s) in the next random selection. Therefore, in step 840, the ESL records the index value of the time slot to exclude the time slots that have been selected and have the same index value(s) in the next time frame. In a simplified implementation, it may be without using the queue, but only using a single variable to store the most recently known index value of time slot occupied by other ESL(s).

Figure 9:
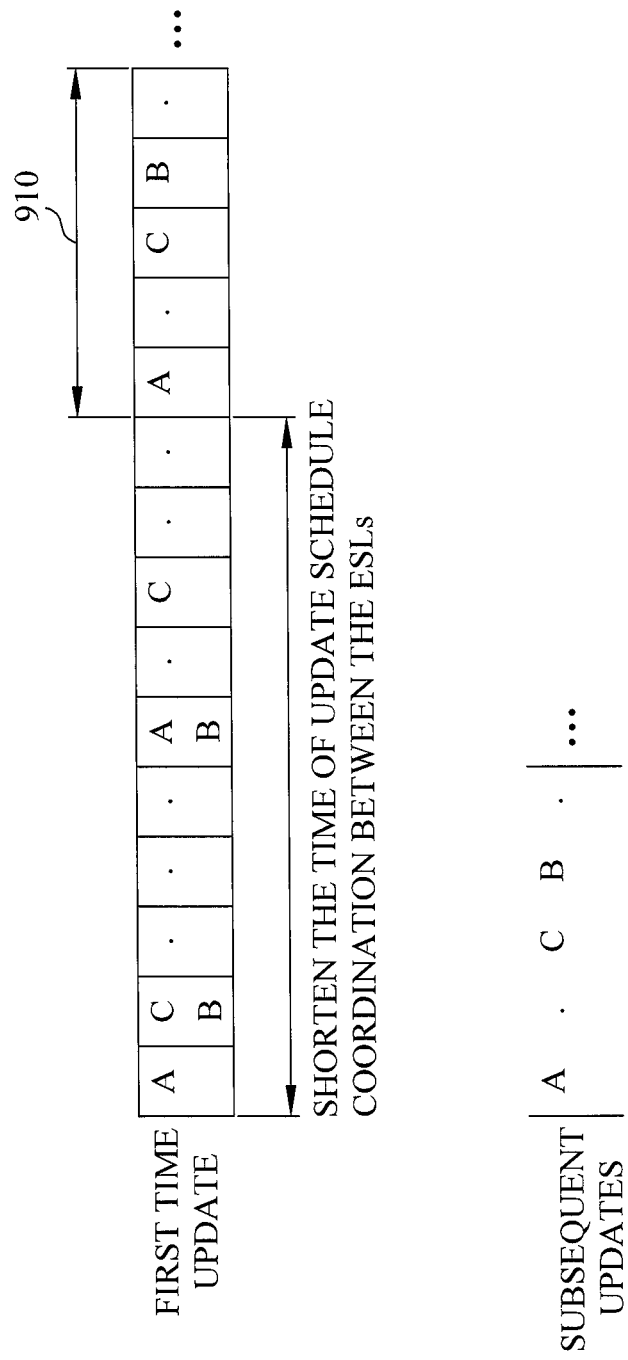
FIG. 9 shows an exemplar illustrating an extension process of FIG. 8 for updating ESLs, according to an exemplary embodiment.

On extending the aforementioned operation flow in FIG. 8, the ESL stores the index value of used time slot in the end of the ESL update procedure, and thus does not need to re-randomly select a time slot in next update. As shown in the exemplar of FIG. 9, in the first update after the first time deployment is finished (for example, beginning the first update at 9:00), all ESLs such as A, B, C decide to use their own update time slots after coordination, as indicated by a reference 910, ESL A uses the time slot 1 to update, ESL B uses the time slot 4 to update, and ESL C uses the time slot 3 to update. Then, in subsequent updates (such as beginning the update time at 12:00, 15:00, . . . ), all the ESLs A, B, and C may directly use the time slots coordinated last time for update. In other words, the following update schedule may skip the beginning coordination process, and immediately begins the update with a steady state. So that the time of the update schedule coordinated between the ESLs may be shortened.

For example, in the exemplar of FIG. 10A, the update of the ESLs B and C is completed in time frame 1, and time slots 3 and 4 are released in time frame 2, therefore, ESL A may randomly select additional time slot 3 in time frame 3. According to another exemplar, every several (for example, the total number of the ESL $n_{max}$) time frames, the ESL may randomly select additionally a time slot, as shown in FIG. 10B, when $n_{max}$ is equal to 3, ESL A randomly selects additional time slot 5 in time frame 4. In the time frame 5, ESL A update is completed and all the time slots used by the ESL A are released, and ESL C randomly selects additional time slot 1.

According to the above-mentioned exemplary embodiments and variety of multiple exemplary embodiments about ESL updating that the communication timing is decided by the ESL itself, when the interference causes the communication failed, the ESL may decide the next communication timing. In the exemplary embodiments, the disclosed ESLs do not need to receive new update schedule message(s) from the gateway when the ESLs fail to perform the update. These ESLs may re-coordinate to generate the update schedule according to a newest upper limit of a total number of ESLs received by each ESL's transceiver, thereby avoiding the power consumption or the time delay.

Figure 11:
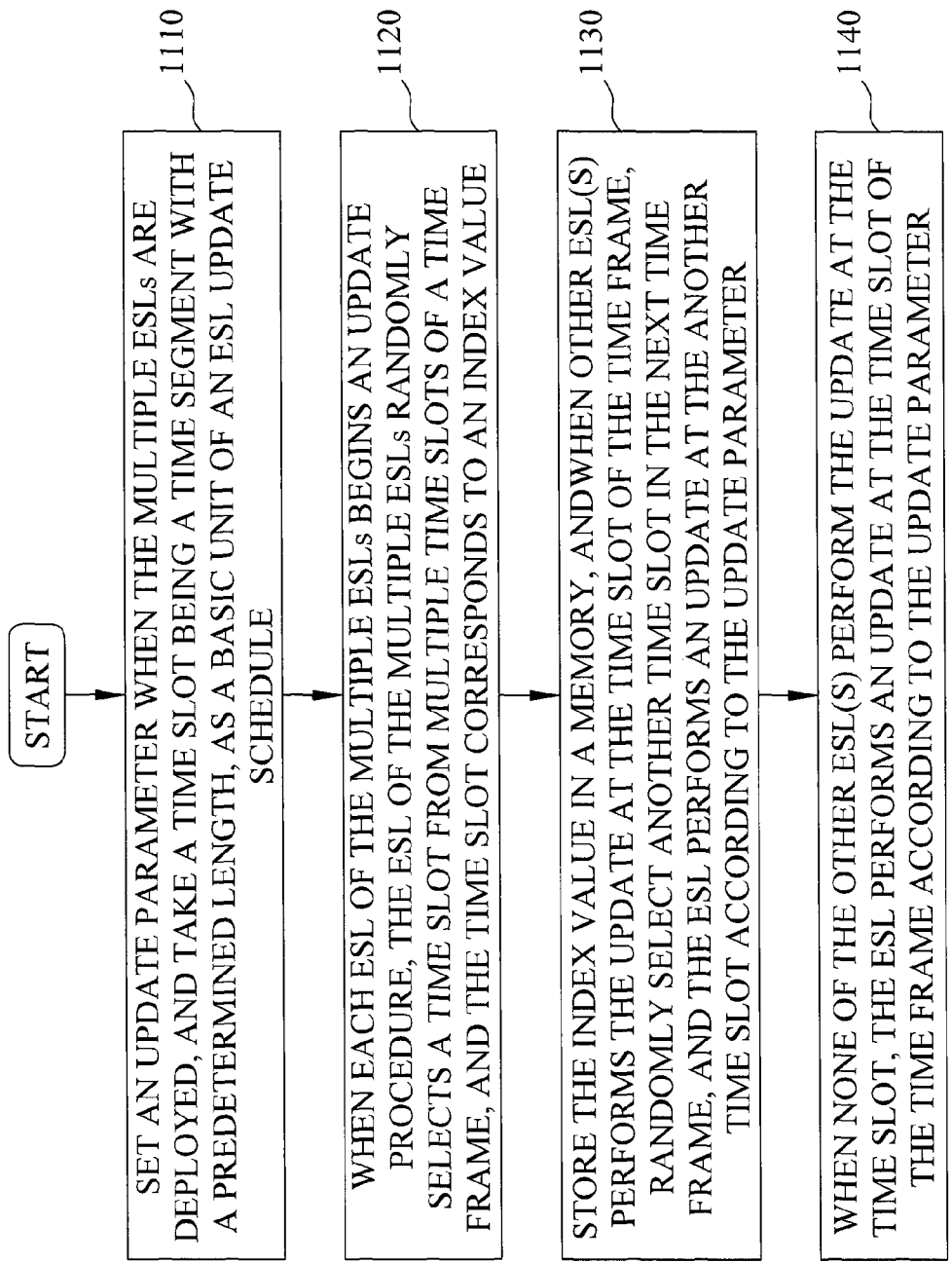
FIG. 11 shows a method for updating ESLs, according to an exemplary embodiment.

FIG. 11 shows a method for updating ESLs, according to an exemplary embodiment. The method may be implemented in an ESL system having multiple ESLs. Refer to FIG. 11, according to the exemplary embodiment, the method may set an update parameter when the multiple ESLs are deployed, and takes a time slot being a time segment with a predetermined length, as a basic unit of an ESL update schedule (step 1110). When each ESL of the multiple ESLs begins an update procedure, the ESL of the multiple ESLs randomly selects a time slot from multiple time slots of a time frame, and the time slot corresponds to an index value (step 1120). The index value may be stored in a memory. And, when other ESL(s) performs the update at the time slot of the time frame, another time slot is randomly selected in the next time frame and the ESL performs an update at the another time slot according to the update parameter (step 1130); and when none of the other ESL(s) perform the update at the time slot, the ESL performs an update at the time slot of the time frame according to the update parameter (step 1140).

There are a variety of schemes to implement step 1120 and step 1130. For example, step 1120 and step 1130 may respectively be implemented by the exemplars of step 510 and step 540 in FIG. 5, or step 1120 and step 1130 may respectively be implemented by the exemplars of step 810 and step 840 in FIG. 8; In other words, when an ESL update process begins, each ESL randomly selects a time slot from one or more selectable time slots of multiple time slots in a time frame, and excludes the time slots that have been selected and have the same index value in the next time frame. Step 1120 and step 1130 may be implemented by the exemplar in FIG. 10A or FIG. 10B; In other words, after several time frames, those ESL(s) in the multiple ESLs not yet completed may randomly select at least one additional time slot to update, the at least one additional time slot is a time slot released by one or more ESLs that have completed update.

Figure 12:
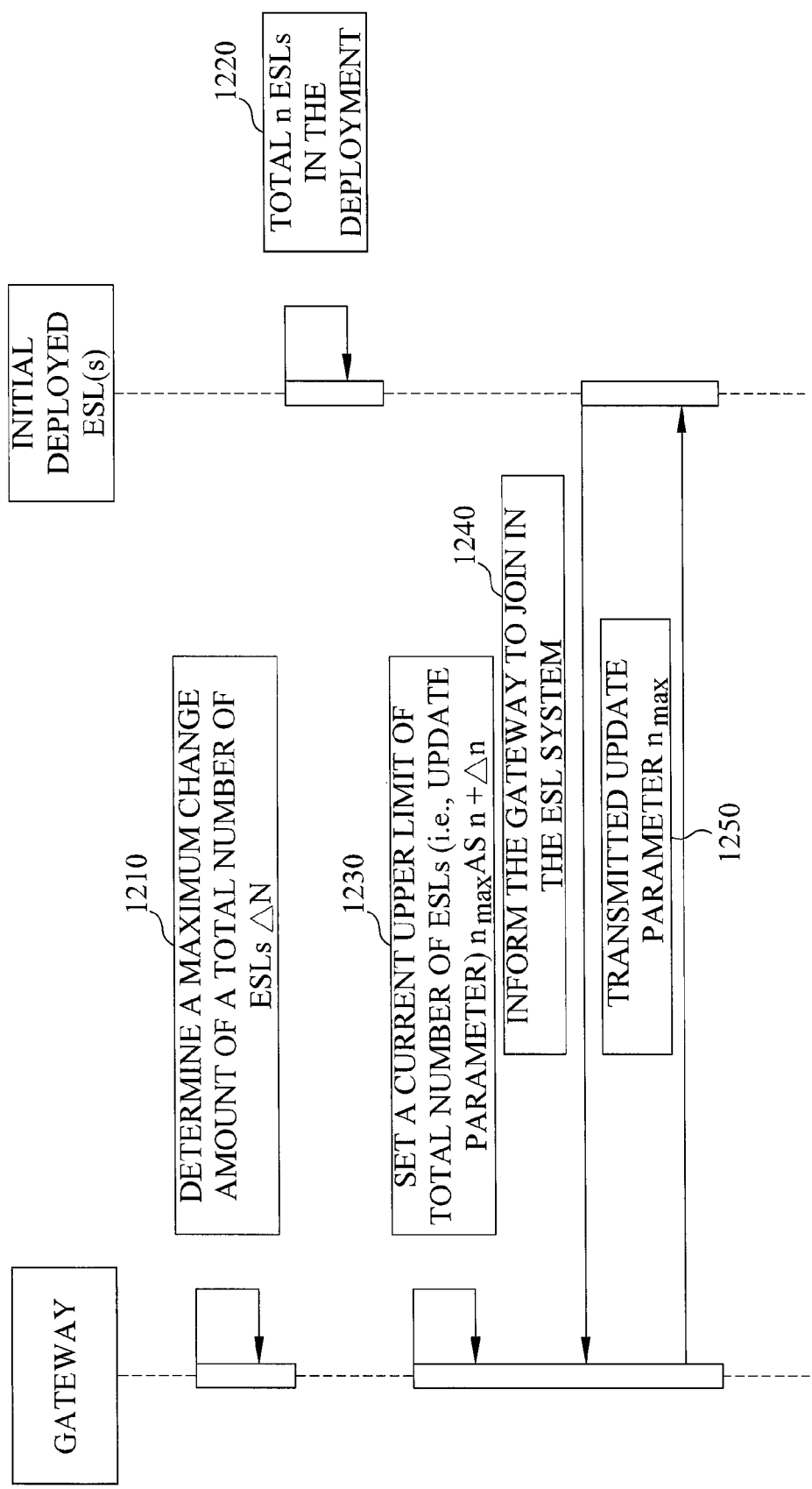
FIG. 12 shows a flow of setting update parameters of ESLs on initial deployment of the ESLs, according to an exemplary embodiment.
Figure 13:
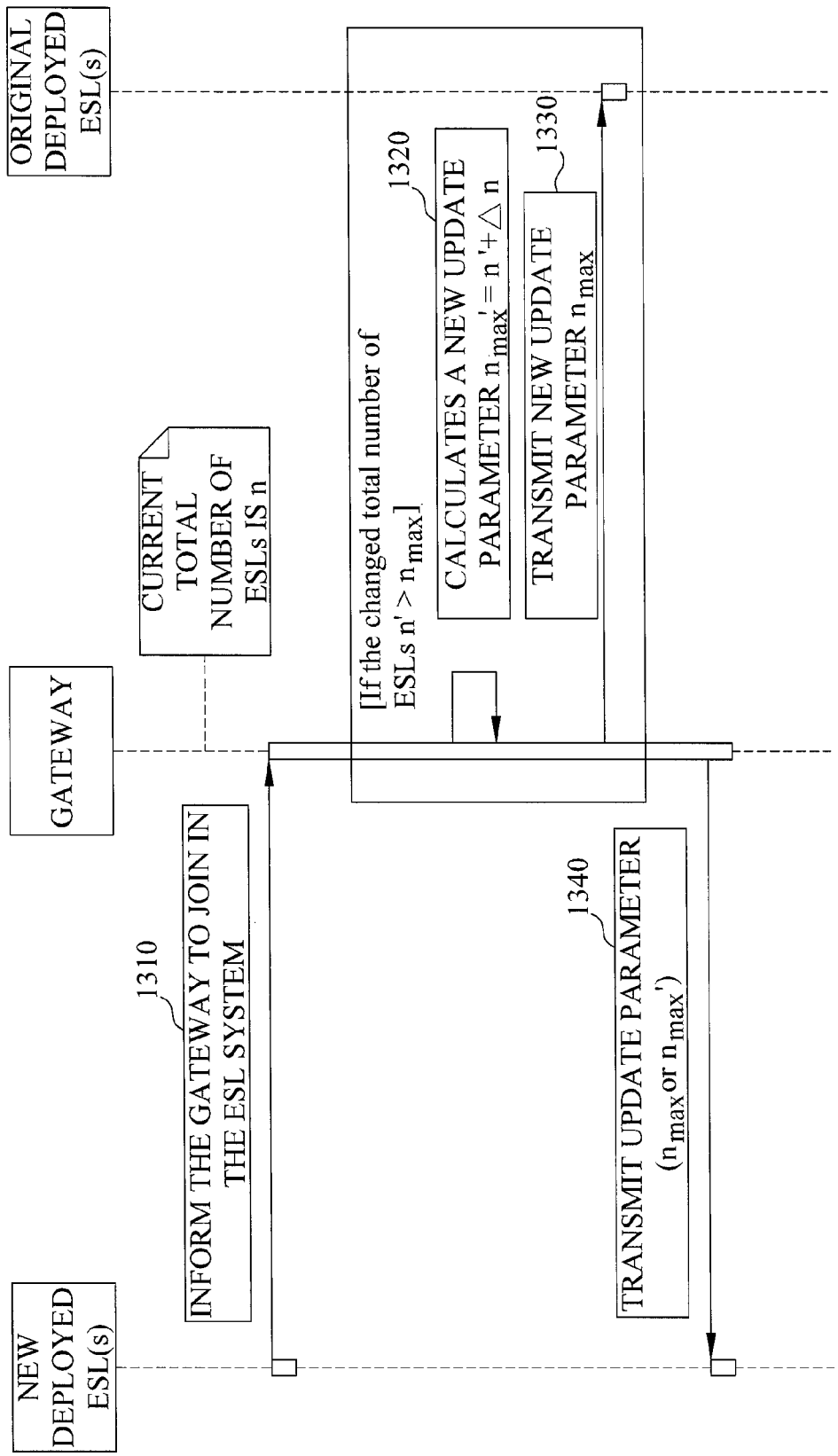
FIG. 13 shows a flow of setting update parameters of ESLs when adding one or more new ESLs to the current ESL system, according to an exemplary embodiment.
Figure 14:
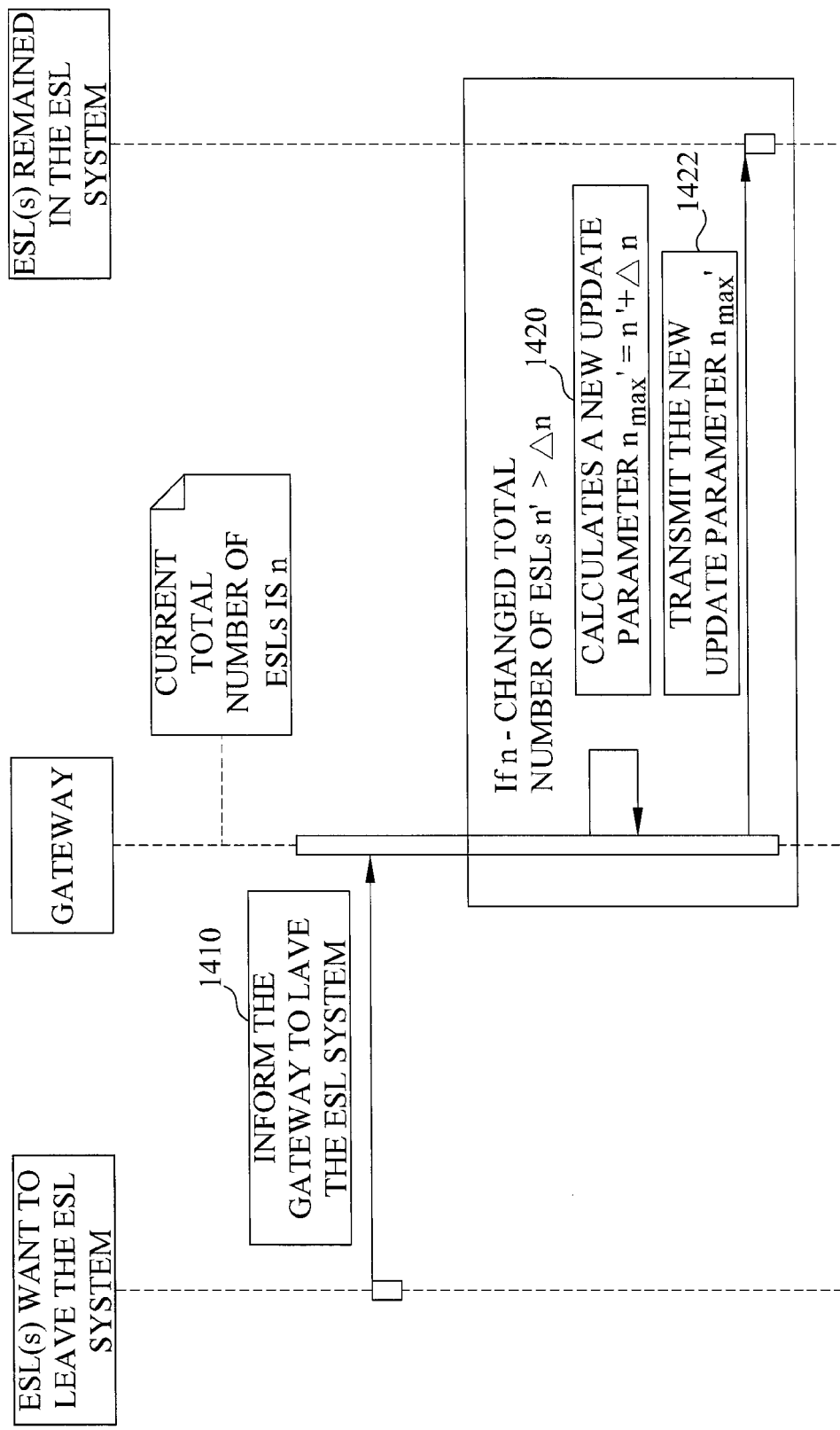
FIG. 14 shows a flow of setting update parameters of ESLs when removing one or more ESLs from the current ESL system, according to an exemplary embodiment.

The following FIG. 12, FIG. 13, and FIG. 14 illustrate flows of setting update parameters of ESLs on initial deployment of the ESLs, adding new ESL(s) to the current ESL system, and removing ESL(s) from the current ESL system, respectively, according to exemplary embodiments. When the initial deployment of the ESLs starts, as shown in FIG. 12, the gateway first determines a maximum change amount of a total number of ESLs $\Delta n$, as shown in step 1210. There are total n ESLs in the initial deployment, as shown in step 1220. The gateway sets a current upper limit of the total number of ESLs (i.e., update parameter) $n_{max}$ as $n+\Delta n$, as shown in step 1230. Each of these n ESLs may inform the gateway to join in the ESL system through its own transceiver, as shown in step 1240; and receive the update parameter $n_{max}$ transmitted from the gateway through the transceiver, as shown in step 1250.

When adding a new ESL in an ESL system, as shown in FIG. 13, each of the new deployed ESL(s) may inform the gateway to join in the ESL system through its own transceiver, as shown in step 1310. When the changed total number of ESLs n' is greater than the current upper limit of a total number of ESLs $n_{max}$, the gateway calculates a new update parameter $n_{max}'$, as shown in step 1320, where $n_{max}'=n'+\Delta n$, and transmits the new update parameter to all the ESLs, including transmitting the new update parameter $n_{max}'$ to the original deployed ESL(s) and transmitting the update parameter ($n_{max}$ or $n_{max}'$) to the new deployed ESL(s), as shown in steps 1330 and 1340, respectively. When reducing ESL(s), as shown in FIG. 14, the ESL(s) that wants to leave informs the gateway to leave the ESL system through each transceiver, as shown in step 1410. When the difference of the total number of ESLs n and the changed total number of ESLs n' is greater than the maximum difference of total number of ESL $\Delta n$, the gateway calculates a new update parameter $n_{max}'$, as shown in step 1420, where $n_{max}'=n'+\Delta n$, and transmits the new update parameter $n_{max}'$ to the ESL(s) remained in the ESL system, as shown in step 1422.

As mentioned above, after the ESL system completes the deployment, when the total number of ESLs of the ESL system has a considerable change, the ESLs may receive, through the transceiver, the new update parameter $n_{max}'$ from the gateway when ESLs perform the data updates. Alternatively, when the new ESL(s) joins in the ESL system already in operation, the ESL(s) may receive, through the transceiver, a current update parameter $n_{max}'$ from other ESL(s), calculate the new update parameter $n_{max}'$, transmit, through the transceiver, the new update parameters $n_{max}'$ to other ESL(s). The ESL(s) received the new update parameters $n_{max}'$ may transmit to other ESL(s), until all ESLs in the entire ESL system receive the new update parameter $n_{max}'$.

Figure 15:
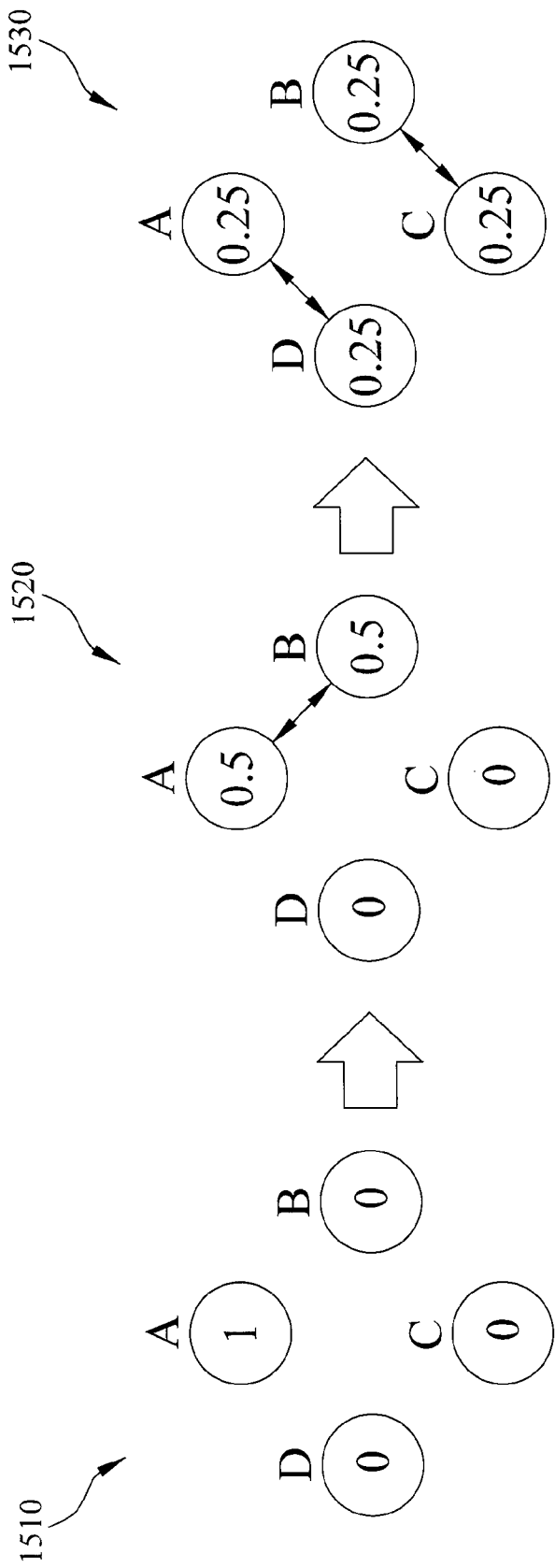
FIG. 15 shows an exemplar illustrating an upper limit of a current total number of ESLs is calculated by the ESLs through periodically exchanging information with each other, according to an exemplary embodiment.

The aforementioned $n_{max}$ may be calculated by the ESL itself through ESLs periodically exchanging messages with each other, doing statistics of the current total number of ESLs in the ESL system, rather than receiving from the gateway through the transceiver or the input-output interface. For example, the scheme in FIG. 15 is one of these schemes. In FIG. 15, for every fixed time, all ESLs begin to exchange messages with each other to calculate the total number of ESLs. In the beginning, a specified ESL A sets a value of m (m=1) in its memory, and each of the other ESLs (e.g., B, C, D) except the specified ESL A sets a value of m (m=0) in its memory, as indicated by an arrow 1510. Each ESL randomly exchanges information of the value of m with a neighboring ESL, and updates the value of m as the average of two original values of m of the two ESLs after exchanging information. For example, as indicated by an arrow 1520, the value of m for ESL A (denoted by $m_A$) is 1 and the value of m for ESL B (denoted by $m_B$) is 0. After ESLs A and B exchange messages, the updated m values for both ESLs are $m_A'=m_B'=(0+1)/2$. The above process is repeated until all ESLs complete information exchange, as indicated by arrow 1530, the m value for each ESL is 1 divided by the current total number of ESLs, and the m value for each of ESLs A~D is 0.25 in this exemplar. In other words, each ESL of multiple ESLs in the ESL system stores a respective value, and the multiple ESLs periodically exchange messages of their stored values with each other. And, each of two ESLs exchanging their stored values with each other updates its stored value as the average of the two ESLs' stored value, and continues to exchange its stored value with other ESL(s) of the multiple ESLs.

According to an exemplary embodiment, an updating method may be adapted to an ESL having at least one storage device to store at least one readable program code, and at least one processor may read the at least one readable program code to perform the method. The method may comprise: taking a time slot, being a time segment of a predetermined length, as a basic unit of an ESL update schedule; when an ESL update procedure begins, randomly selecting, by the ESL, a time slot in multiple time slots of a time frame, wherein the time slot corresponds to an index value, and storing the index in a memory; when other ESL(s) performs an update at the time slot of the time frame, randomly selecting, by the ESL, another time slot in a next time frame, and performing the update, by the ESL, at the another time slot according to an update parameter; and when none of the other ESL(s) performs the update at the time slot, performing the update, by the ESL, at the time slot of the time frame according to the update parameter.

According to another exemplary embodiment, an updating apparatus of an ESL may connect to a gateway, and may comprise a transceiver, a controller, a memory and a random number generator. When an ESL update procedure begins, the random number generator randomly selects a time slot from multiple time slots of a time frame, wherein the time slot corresponds to an index value. The transceiver has a media condition detector to detect whether other ESL(s) perform an update at the time slot. The controller stores the index value in the memory, and when none of the other ESL(s) perform the update at the time slot, the controller performs the update at the time slot. When other ESL(s) perform the update at the time slot, the controller enables the random number generator to randomly select another time slot in a next time frame.

The disclosed updating apparatus of an ESL may be implemented by an integrated circuit. Yet in another embodiment, the updating apparatus of the ESL may further include a processor, and the processor reads at least one readable program code from at least one memory device for achieving one or more functions of the random number generator, the transceiver and the controller.

The detailed and the examples for updating an ESL have been described in the above of the disclosure and other related embodiments, and are not restated here.

In summary, in the disclosed exemplary embodiments of a system for updating ESLs and a method for updating ESLs, the ESLs coordinate with each other according to a parameter representing the deployment of a current ESL system. And each ESL decides the update schedule by itself according to the parameter, rather than the gateway decides the update schedule and further transmits to the ESL(s).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for updating electronic shelf labels (ESLs), comprising multiple ESLs and a gateway connected to the multiple ESLs to update at least one data of at least one of the multiple ESLs, and each ESL further including:
   a random number generator that selects a time slot from multiple time slots of a time frame when an ESL update procedure begins, wherein the time slot corresponds to an index value;
   a transceiver including a media condition detector to detect whether other ESL(s) of the multiple ESLs performs an update at the time slot;
   a memory; and
   a controller that stores the index value in the memory;
   wherein the ESL calculates an update parameter through periodically exchanging one or more messages with the other ESL(s), performs an update at the time slot according to the update parameter when none of the other ESL(s) performs the update at the time slot, and the controller enables the random number generator to randomly select another time slot from a next time frame when the other ESL(s) performs the update at the time slot.

2. The system as claimed in claim 1, wherein said time slot is a time segment of a predetermined length and is a basic unit of an ESL update schedule, and said time frame consists of a fixed number of time slots, and updating each ESL requires at least one time frame.

3. The system as claimed in claim 1, wherein said multiple time slots of said time frame are represented by index values of 1 to $n_{max}$ according to a time order, where $n_{max}$ is an ESL system capacity, and represents an upper limit of a total number of ESLs in said system.

4. The system as claimed in claim 3, wherein when the ESL joins in said system, $n_{max}$ is written in the memory through an input-output interface.

5. The system as claimed in claim 1, wherein when a total number of ESLs in said system exceeds a pre-determined number, each ESL in said system receives a new upper limit of the total number of ESLs through said transceiver.

6. The system as claimed in claim 1, wherein said ESL uses a queue to record one or more index values corresponding to one or more time slots updated by existing other ESL(s).

7. The system as claimed in claim 2, wherein said ESL performs the update at the time slot with a same index value in each time frame of said at least one time frame, until the update is completed.

8. The system as claimed in claim 1, wherein said ESL performs the update by randomly selecting at least one additional time slot after at least one time frame.

9. The system as claimed in claim 1, wherein when said ESL fails to perform the update, an update schedule is re-coordinately generated according to a newest upper limit of a total number of ESLs received by said transceiver, instead of a new update schedule message received from said gateway.

10. The system as claimed in claim 1, wherein in a first update for a first time deployment of said system, all ESLs in the system after coordinating decide a respective update time slot used by their own, and re-randomly selecting a time slot is not required for one or more subsequent updates.

11. A method for updating ESLs, adapted to an ESL system having multiple ESLs, and comprising:
   in deploying the multiple ESLs, setting an update parameter and taking a time slot being a predetermined length of a time segment, as a basic unit of an ESL update schedule;
   randomly selecting a time slot in multiple time slots of a time frame when an ESL update procedure begins for each ESL of the multiple ESLs, where the time slot corresponds to an index value;
   storing the index value in a memory, and when none of other ESL(s) of the multiple ESLs performs an update at the time slot, performing the update by the ESL, at the time slot of the time frame according to the update parameter; and
   when said other ESL(s) performs the update at the time slot of the time frame, randomly selecting another time slot in a next time frame, performing the update by the ESL, at the another time slot according to the update parameter;
   wherein the ESL calculates the update parameter through periodically exchanging one or more messages with said other ESL(s).

12. The method as claimed in claim 11, wherein when in deploying the multiple ESLs, said method further includes:
   determining, by a gateway, a maximum change amount of a total number of ESLs;
   after deploying said multiple ESLs, setting, by the gateway, a current upper limit of the total number of ESLs; and
   informing the gateway, by the multiple ESLs, of joining in said ESL system, and transmitting the current upper limit of the total number of ESLs, from the gateway to the multiple ESLs.

13. The method as claimed in claim 12, wherein when one or more ESLs are added and a changed total number of ESLs is greater than said current upper limit of the total number of ESLs, the gateway transmits a new update parameter to the added one or more ESLs and the multiple ESLs originally deployed.

14. The method as claimed in claim 11, wherein when said ESL update procedure begins, each ESL of said multiple ESLs randomly selects said time slot from one or more selectable time slots in said time frame, and excludes one or more selected time slots with a same index value in said next time frame.

15. The method as claimed in claim 11, wherein at least one ESL of said multiple ESLs randomly selects at least one additional time slot to perform the update, where the at least one ESL has not been updated completely after several time frames and the at least one additional time slot is at least one time slot released by at least one other ESL that has been updated completely.

16. The method as claimed in claim 11, wherein said multiple time slots of said time frame are represented by index values of 1 to $n_{max}$ according to a time order, and said $n_{max}$ is calculated by each ESL itself through periodically exchanging messages with each other, doing statistics of a current total number of ESLs in said ESL system.

17. The method as claimed in claim 16, wherein each ESL of said multiple ESLs first stores a value, periodically exchanges the stored value between each other through one or more messages, and each ESL of every two ESLs exchanging both stored values updates its stored value to be an average of stored values of the two ESLs, and continuously exchanges its stored value with other one or more ESLs of said multiple ESLs.

18. An updating method, adapted to an electronic shelf label (ESL) having at least one storage device to store at least one readable program code, and at least one processor reading the at least one readable program code to perform the updating method comprising:
   taking a time slot being a time segment of a predetermined length, as a basic unit of an ESL update schedule;
   when an ESL update procedure begins, randomly selecting, by the ESL, a time slot in multiple time slots of a time frame, wherein the time slot corresponds to an index value, and storing the index in a memory;
   when other ESL(s) performs an update at the time slot of the time frame, randomly selecting, by the ESL, another time slot in a next time frame, and performing the update, by the ESL, at the another time slot according to an update parameter; and when none of the other ESL(s) performs the update at the time slot, performing the update, by the ESL, at the time slot of the time frame according to the update parameter;
   wherein the ESL calculates the update parameter through periodically exchanging one or more messages with the other ESL(s).

19. The updating method as claimed in claim 18, wherein said method further includes:
   using a queue of said memory to record one or more index values corresponding to one or more time slots of other ESL(s) that has performed the update.

20. The updating method as claimed in claim 18, wherein said method further includes:
   when said ESL update procedure begins, randomly selecting said time slot from one or more selectable time slots in said time frame, and excluding one or more selected time slots with a same index value in said next time frame.

21. The updating method as claimed in claim 18, wherein said method further includes:
   receiving said update parameter from a gateway.

22. The updating method as claimed in claim 18, wherein said time frame consists of a fixed number of time slots, and updating each ESL requires at least one time frame.

23. An updating apparatus of an electronic shelf label (ESL), connecting to a gateway and comprising:
   a random number generator that randomly selects a time slot from multiple time slots of a time frame when an ESL update procedure begins, where the time slot corresponds to an index value;
   a transceiver having a media condition detector to detect whether other ESL(s) performs an update at the time slot;
   a memory; and
   a controller that stores the index value in the memory, and when none of the other ESL(s) performs the update at the time slot, the controller performs the update according to an update parameter at the time slot, and when said other ESL(s) performs the update at the time slot, the controller enables the random number generator to randomly select another time slot in a next time frame;
   wherein the ESL calculates the update parameter through periodically exchanging one or more messages with said other ESL(s).

24. The apparatus as claimed in claim 23, wherein said time slot is a time segment of a predetermined length and is a basic unit of an ESL update schedule, and said time frame consists of a fixed number of time slots, and updating each ESL requires at least one time frame.

25. The apparatus as claimed in claim 23, wherein said multiple time slots of said time frame are represented by index values of 1 to $n_{max}$ according to a time order, where $n_{max}$ is an ESL system capacity, and represents an upper limit of a total number of ESLs in said system.

26. The apparatus as claimed in claim 23, wherein said multiple time slots of said time frame are represented by index values of 1 to $n_{max}$ according to a time order, and said $n_{max}$ is calculated by each ESL itself through periodically exchanging messages with each other, doing statistics of a current total number of ESLs in an ESL system.

27. The apparatus as claimed in claim 23, wherein when said ESL update procedure begins, said ESL randomly selects said time slot from one or more selectable time slots in said time frame, and excludes one or more selected time slots with a same index value in said next time frame.

28. The apparatus as claimed in claim 23, wherein said apparatus is implemented by an integrated circuit.

29. The apparatus as claimed in claim 23, wherein said apparatus further include a processor, and the processor reads at least one readable program code from at least one memory device for achieving one or more functions of the random number generator, the transceiver and the controller.

* * * * *